United States Patent
Hutchison et al.

(10) Patent No.: US 8,560,790 B2
(45) Date of Patent: *Oct. 15, 2013

(54) INCREMENTAL BACKUP OF SOURCE TO TARGET STORAGE VOLUME

(75) Inventors: Gordon D. Hutchison, Eastleigh (GB); Cameron J. McAllister, Eastleigh (GB); Lucy Raw, Winchester (GB); Bruce J. Smith, Emsworth (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/463,681

(22) Filed: May 3, 2012

(65) Prior Publication Data

US 2012/0221816 A1 Aug. 30, 2012

Related U.S. Application Data

(63) Continuation of application No. 12/729,166, filed on Mar. 22, 2010.

(30) Foreign Application Priority Data

Mar. 30, 2009 (EP) .................................. 09156717

(51) Int. Cl.
*G06F 12/00* (2006.01)
*G06F 13/00* (2006.01)
*G06F 13/28* (2006.01)
*G06F 7/00* (2006.01)
*G06F 17/00* (2006.01)

(52) U.S. Cl.
USPC ........... 711/162; 711/100; 711/112; 711/153; 711/161; 707/644; 707/645; 707/646; 707/647; 707/652; 707/649; 707/638; 707/639; 707/640; 707/657; 707/661; 707/662; 707/663; 707/664; 707/668; 707/670; 707/674; 707/679

(58) Field of Classification Search
None
See application file for complete search history.

(56) References Cited

U.S. PATENT DOCUMENTS

| | | | | |
|---|---|---|---|---|
| 2004/0243775 | A1* | 12/2004 | Coulter et al. | 711/162 |
| 2006/0129775 | A1* | 6/2006 | Hulsey | 711/162 |
| 2007/0106709 | A1* | 5/2007 | Augenstein et al. | 707/203 |
| 2008/0294859 | A1* | 11/2008 | Nguyen | 711/162 |

* cited by examiner

*Primary Examiner* — Sanjiv Shah
*Assistant Examiner* — Marwan Ayash
(74) *Attorney, Agent, or Firm* — Griffiths & Seaton PLLC

(57) ABSTRACT

A flashcopy of a source storage volume to a target storage volume is initiated. The content of the source storage volume is stored on the target storage volume in a space efficient manner. The space requirement of the stored content on the target storage volume is monitored. The flashcopy is terminated when the space requirement reaches a predetermined level. The stored content on the target storage volume is copied to a backup storage medium. A new flashcopy of the source storage volume is initiated.

11 Claims, 9 Drawing Sheets

INCREMENTAL BACKUP OF SOURCE TO TARGET STORAGE VOLUME

CROSS-REFERENCE TO RELATED APPLICATIONS

This application is a Continuation of U.S. patent application Ser. No. 12/729,166, filed on Mar. 22, 2012, which claims priority to European Patent Application No. 09156717.2, filed Mar. 30, 2009, and entitled "An Incremental Backup Strategy."

BACKGROUND OF THE INVENTION

1. Field of the Invention

The present invention relates in general to computers, and more particularly to method, system, and computer program product embodiments for performing a backup of a source storage volume to a target storage volume.

2. Description of the Related Art

The storage of data in large organizations is of basic importance, both for reliability of the data and for the ability to recover data in the event of any hardware failure. Storage area network (SAN) is an architecture that is used when very large amounts of data are needed to be stored in a reliable and secure manner. This technology allows networks to be created that support the attachment of remote computer storage devices such as disk arrays to servers in such a way that, to the operating system, the devices appear as locally attached. It is common in these networks to include a large amount of redundancy, both in the data storage and in the hardware connections between the individual components.

SUMMARY OF THE DESCRIBED EMBODIMENTS

Various methods exist for creating data redundancy. For example, a function such as the flashcopy function enables an administrator to make point-in-time, full volume copies of data, with the copies immediately available for read or write access. The flashcopy can be used with standard backup tools that are available in your environment to create backup copies on tape. Flashcopy creates a copy of a source volume on a target volume. This copy is called a point-in-time copy. When a flashcopy operation is initiated, a relationship is created between a source volume and target volume. This relationship is a "mapping" of the source volume and the target volume. This mapping allows a point-in-time copy of that source volume to be copied to the associated target volume. The relationship exists between this volume pair, from the time that the flashcopy operation is initiated, until the storage unit copies all data from the source volume to the target volume or the relationship is deleted.

When the data is physically copied, a background process copies tracks from the source volume to the target volume. The amount of time that it takes to complete the background copy depends on the following criteria, the amount of data being copied, the number of background copy processes that are occurring and any other activities that are presently occurring. Flashcopy works in that the data that is being copied does not actually need to be copied instantaneously, it only needs to be copied just prior to an update causing on overwrite of the old data on the source volume. So, as data changes on the source volume, the original data is copied to the target volume before being overwritten on the source.

There is a greatly increased need for secure data backup due to a changed climate on the legal requirements to surrender data. This means that the market for all types of archive services (for example using MAID/TAPE/DVD etc.) is booming. Backing up large volumes of data is a very storage intensive goal. Frequent backups will use a lot of back up media (and also time and bandwidth) to create. However, infrequent backups will leave much more data unprotected between backups. This is particularly wasteful if the volume is sparse, as its size will be much larger than the typical amount of stored live data. Depending on the nature of the datasets on the medium, compression can be used to try to reduce the size of the backup but may slow the backup/restore process and the amount that the data can be compressed will vary depending on the data present.

Another common approach is that an occasional full backup, plus more frequent deltas can be taken of the data since the last backup, and this will reduce greatly the total size of the backups taken for the same protection, although the restore process is now slightly more complicated. Either way, a current common approach is to periodically back up some of the data and/or use compression and/or take deltas at set time intervals to store on some form of persistent media such as tape or DVD etc.

Even using these techniques there are problems with using any finite media (which is cheap and offers long term storage stability). The size of the backups will fluctuate depending on the amount of changes that have happened on the volume since the last backup and also the degree to which they can be compressed will also vary. If there is a fixed size of backup medium (i.e. DVD or tape) then it will not be possible to plan to use the capacity accurately. The frequency of the backups will have to be so that the worst-case scenario can fit onto the backup medium. There needs to be periodic complete backups taken of the volume to use as a base for future changes that are backed-up.

To address the foregoing needs previously described, various embodiments for performing incremental backup operations of a source storage volume to a target storage volume are provided. In one embodiment, by way of example only, a method of performing a backup of a source storage volume to a target storage volume is provided comprising initiating a flashcopy of the source storage volume to the target storage volume, storing the content of the source storage volume on the target storage volume in a space efficient manner, monitoring the space requirement of the stored content on the target storage volume, terminating the flashcopy when the space requirement reaches a predetermined level, copying the stored content on the target storage volume to a backup storage medium, and initiating a new flashcopy of the source storage volume.

Additional system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
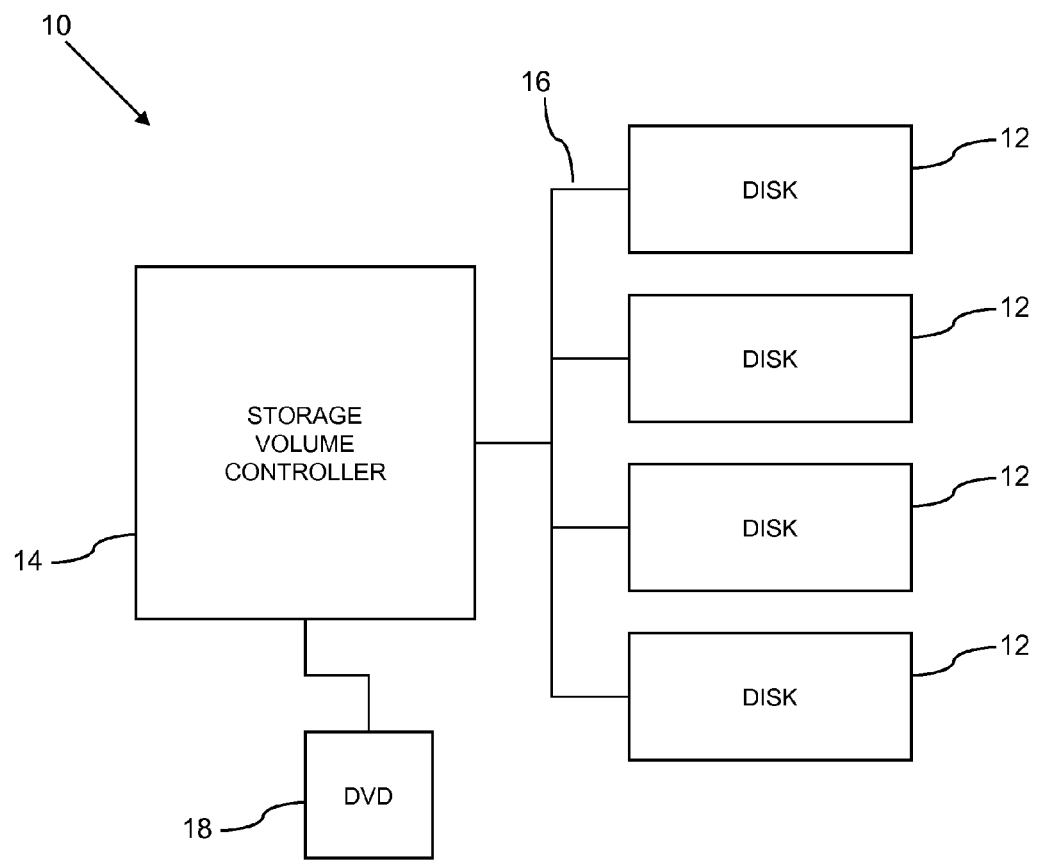
FIG. 1 is a schematic diagram of an exemplary storage system.

Owing to the invention, it is possible to provide an improved data storage backup system. The system delivers an automatic method of triggering a new flashcopy once the actual size of a space efficient flashcopy target reaches a specific size. This process is atomic, and will prevent any data slipping through the gaps between copies. The system provides a way to copy the raw data from the space efficient flashcopy target to a backup media. A managed way to reconstruct the disk based on the deltas is also possible.

The advantages of this invention are the system will run automatically and take more archives when there is more work going through the system and less when there is less work. The power used in tape/DVD media system during backup is minimised, as these are now active only for as long as is necessary to fill one DVD/tape in an efficient manner. Fixed size backup media can be fully utilised and are always of sufficient size to cope with the storage demand.

The technique uses only readily available existing technologies combined in new ways, while reading the contents of a space efficient volume natively without the padding of unwritten space, that can easily been seen to be feasible rather than a completely new implementation. The extra disk space used whilst generating the backups is minimal (only a maximum of the backup size, rather than the whole volume). The archival process (which often involves writing devices with poorer performance than main disk) no longer uses the same volume that the main application reads/writes so can be safely stabilised and read to without affecting the main application. The source disk can be completely restored from a configurable number of archives. It is a trivial amendment to allow the triggering of the archive process at any particular point in (wallclock) time or scheduled time.

Advantageously, the predetermined level is derived from the size of the backup storage medium. The predetermined level at which the first flashcopy is stopped can be set to a size that corresponds to the size of the backup storage medium. Therefore, if a 20 GB storage volume is being backed up using a flashcopy, and a DVD of 4 GB of storage space is being used as the backup storage medium, then when 4 GB of the source storage volume has been copied to the target storage volume using the flashcopy, the flashcopy is terminated. At this point the 4 GB on the target storage volume is copied to the backup storage medium (the DVD), and a new flashcopy is started.

In one exemplary embodiment, the step of storing the content of the source storage volume on the target storage volume comprises including in the stored content a predetermined percentage of the oldest data stored by the source storage volume. While the flashcopy is taking place, then any writes to the source storage volume or any reads to the target storage volume will trigger the copy of content from the source storage volume to the target storage volume. In addition, the process can be improved by also copying over say 5% of the oldest data stored in the source storage volume. This places a limit on the number of flashcopies stored to the backup storage medium that will be needed to reconstruct the original source storage volume.

In an alternative embodiment, the method further comprises detecting that a portion of the source storage volume has not been backed-up in a predetermined number of flashcopies, and wherein the step of storing the content of the source storage volume on the target storage volume comprises including in the stored content the detected portion the source storage volume. This solves the same problem of ensuring that a finite number of the flashcopies stored to the backup storage medium that will be needed to reconstruct the original source storage volume. A predetermined number of flashcopies, say 10, is the maximum number of flashcopies allowed for a source storage volume, and when this number is reached, any data on the source storage volume that has not yet been backed up in any previous flashcopy will automatically form part of the $10^{th}$ flashcopy.

FIG. 1 shows a storage system 10. The storage system 10 comprises a number of storage volumes 12 which are connected to a storage volume controller 14. The storage volume controller 14 has a connection 16 to each storage volume 12, which is a fibre optic cable. The storage volume controller 14 is for managing the access to the storage volumes 12. All read and write requests made to the storage volumes 12 are made through the storage volume controller 14. To an external computer connecting to the storage volume controller 14, the various disks 12 appear as a single memory storage function, regardless of the actual number of volumes 12 present. The system 10 also includes an external backup storage medium 18. The storage volume controller 14 creates redundancy within the storage volumes 12 by backing up data to multiple locations within the volumes 12. When a more permanent record is needed then data can be stored onto the external backup storage medium 18, which in FIG. 1 is shown as a conventional read/write DVD.

In the system of FIG. 1, a volume 12 that is to have a continuous backup strategy in place on it will have a special point in time copy taken of it using a flashcopy. This does not actually physically copy the data at that point. The flashcopy process works on the basis that the data that is being copied does not actually need to be copied instantaneously, it only needs to be copied just prior to the old version being lost due to an update causing on overwrite of the old data. If these are maintained it is impossible to tell how fast the copy is actually taking place. So, as data changes on the source volume 12 (the one being backed up from) the original data is copied to the target volume 12 before being overwritten on the source volume 12.

Figure 2:
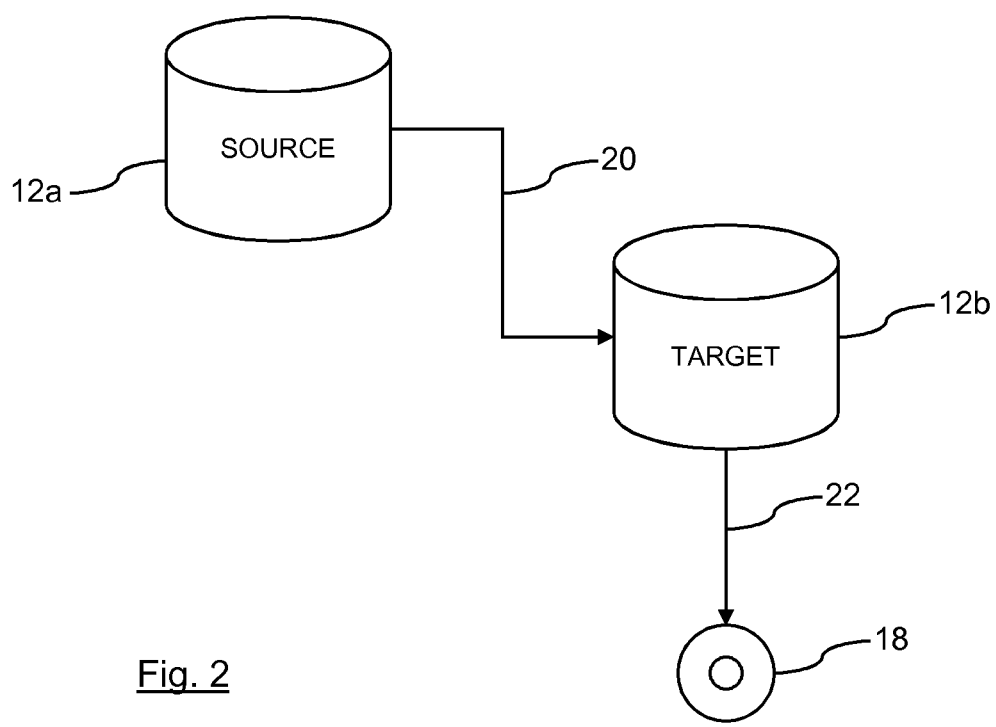
FIG. 2 is a schematic diagram of part of the exemplary storage system previously depicted in FIG. 1.

FIG. 2 illustrates the backup process in more detail. In the system 10, the target volume 12*b* (the storage volume being backed up to) is a space efficient volume, in which short unused space is logically stored as zeroes in a coded manner, so the storage volume 12*b* will only use up real capacity for the actual amount of data written to it. Therefore, as new data is written to the original source dataset 12*a*, the target dataset volume 12*b* (the space efficient flashcopy target) will increase. The flashcopy process is indicated by the arrow 20. The actual physical space requirements of the flashcopy's size on the target 12*b* is monitored, and the moment that the requirement reaches a specified trigger level (in the preferred embodiment, the size of the backup media 18), a new point in time copy (space efficient flashcopy) of the source 12*a* is triggered, copying to a new target backup, which is also space efficient.

At this point, the existing flashcopy on the target source volume 12*b* begins to be copied to the backup storage medium 18, shown by the arrow 22, as the system 10 operates. Therefore, instead of archiving the original dataset, the first, or subsequent, flashcopy on the target 12*b* is now archived instead to the backup medium 18 with confidence that it is of a fixed size limit and will thus complete within a predictable amount of time and space. The flashcopy target dataset, within the target volume 12b, having served its purpose, can now be deleted. A whole or partial restore from the backup data is now possible, if the original dataset on the source storage volume is required. Whole volume recovery would be a process of restoring the volume from the archived deltas by overlaying one backup on top of another in reverse order until either the conjunction the archives contain every part of the dataset, the first flashcopy was reached or all of the deltas had been applied since the restored previous full backup if these are still taken periodically.

Figure 3:
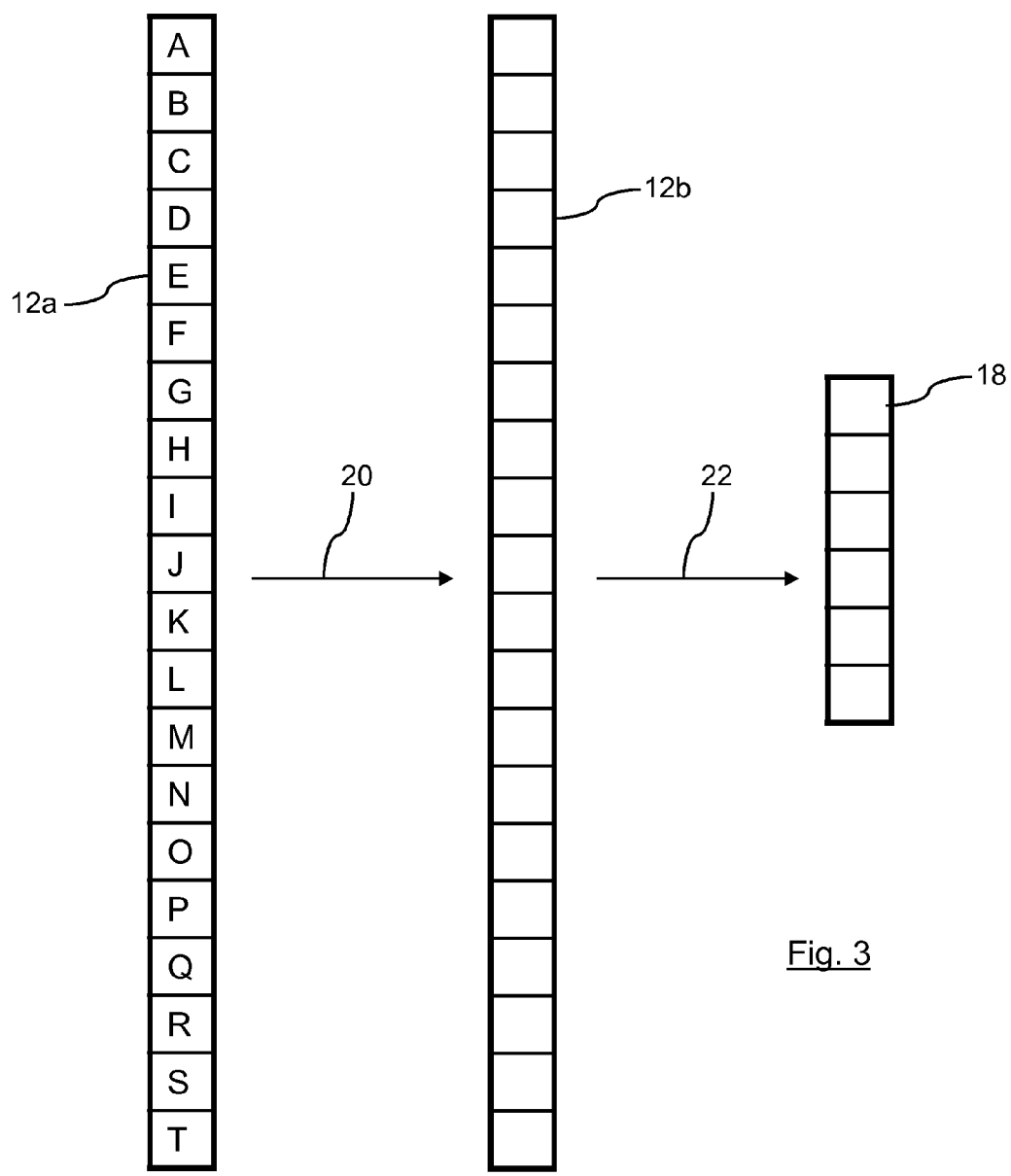
FIGS. 3 to 8 are schematic diagrams of an exemplary backup process.

FIGS. 3 to 9 shows in more detail the working of the backup process using the flashcopy function. The source storage volume 12a (a master disk) is shown as a 20 GB storage volume, with the target storage volume 12b (a space efficient disk) having 5 GB of space allocated for space efficient storage which coincides with the size of the backup storage medium 18. A flashcopy 20 is initiated on the source storage volume 12a linking it to the target storage volume 12b. Over time, the content of the source storage volume 12a is stored on the target storage volume 12b in a space efficient manner. A space efficient map 22 also exists with the fixed size backup medium 18. This map 22 links the logical location of the data with the real location of the data within the space efficient volume 12b. The master disk 12a contains data A to T which is to be incrementally backed-up to the fixed media 18. This is shown in FIG. 3.

Figure 4:
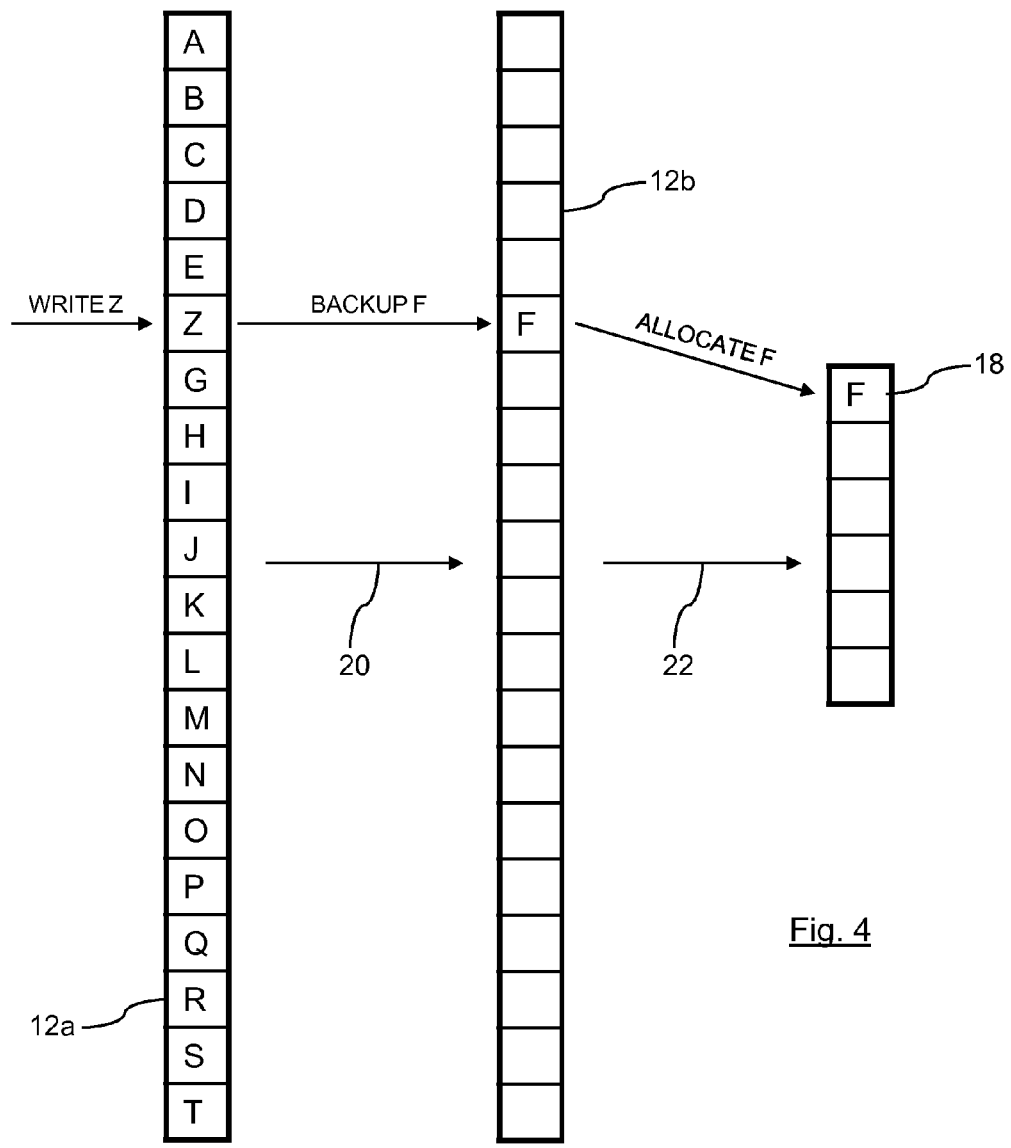

When a data write is made to the source storage volume 12a, then under the flashcopy process 20, a copy of the original data is made in the target storage volume 12b. This process is illustrated in FIG. 4. A new write "Z" is made to the volume 12a, over the existing data "F". This results in the old data "F" being written to the target volume 12b that is backing up the data on the source volume 12a. The write "Z" is then performed on the existing data stored by the volume 12a. An allocation for the data "F" is now made in the storage medium 18, although the actual archive to the storage medium 18 will occur once all the space on the disk 12b is allocated. Depending upon the nature of the backup medium 18, the writing of the data "F" into the medium 18 could occur at this point, or could be carried out once all of the data capacity of the medium 18 has been allocated. Therefore, any writing of new data to the master disk 12a will result in a backup of the old data.

Figure 5:
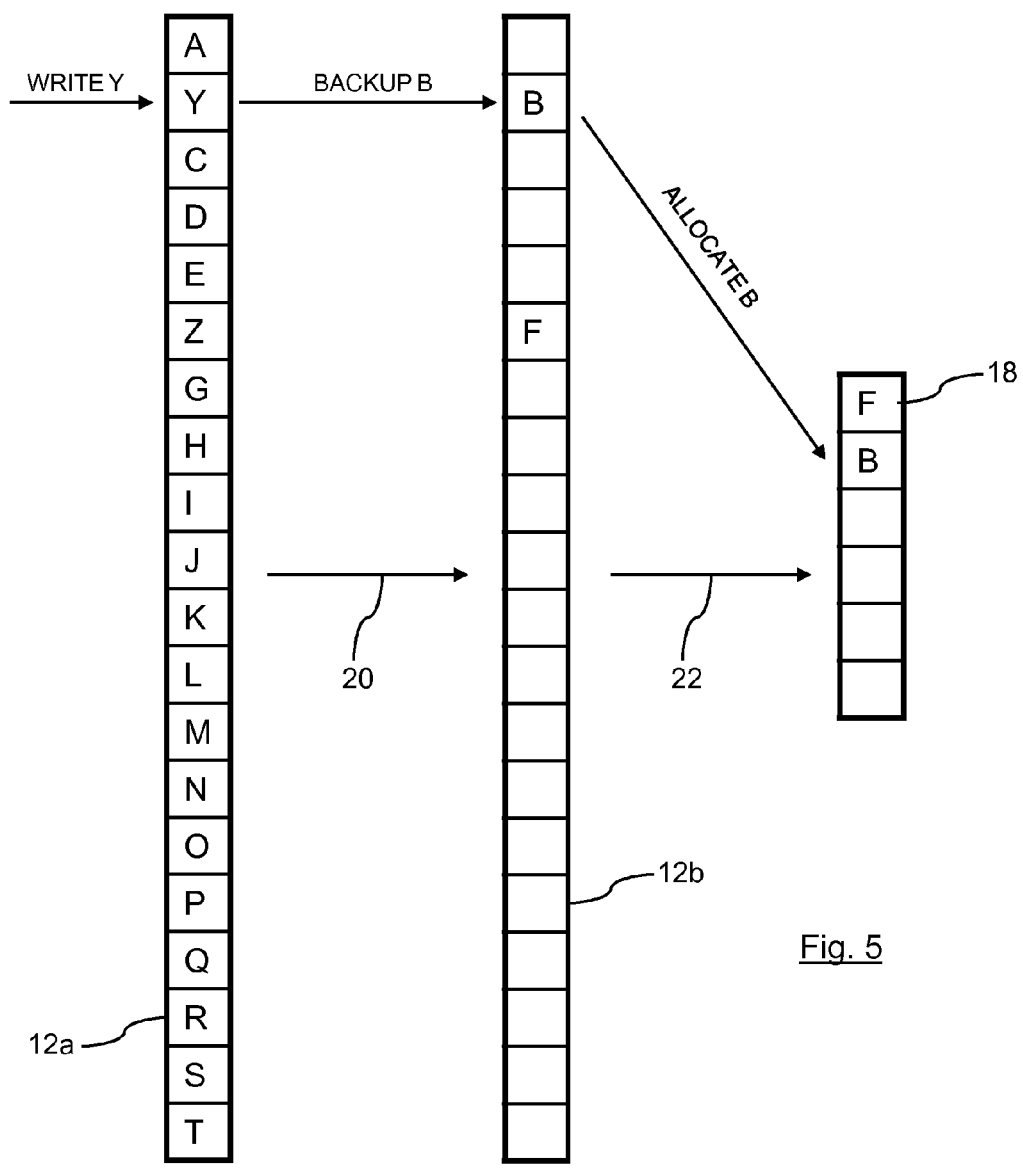
Figure 6:
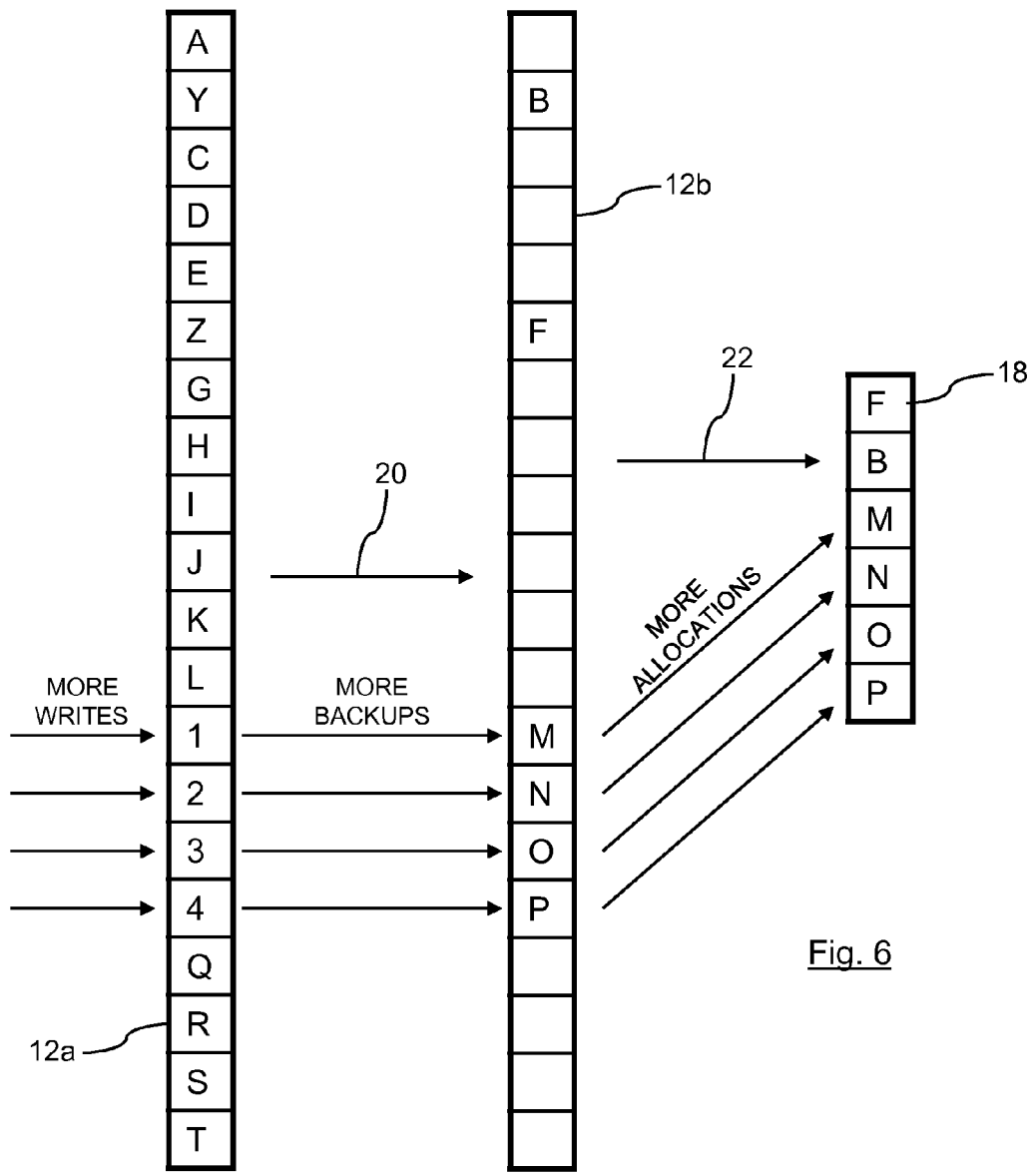

The process of receiving data writes for the main storage volume 12a will continue over time. FIG. 5 shows a new write "Y" arriving that will overwrite the existing data "B" on the disk 12a. Again the flashcopy process 20 will cause a copy of the original data "B" to be backed up to the target of the flashcopy 20, which is the backup storage volume 12b. As before, an allocation for the data "B" is now made in the storage medium 18, although no backup will take place at this point. FIG. 6 sees the process continuing with writes "1" to "4" overwriting sectors "M" to "P". The old data is copied across from the main volume 12a to the backup volume 12b before the writes are carried out, and the backed-up data is allocated in the space efficient disk.

Figure 7:
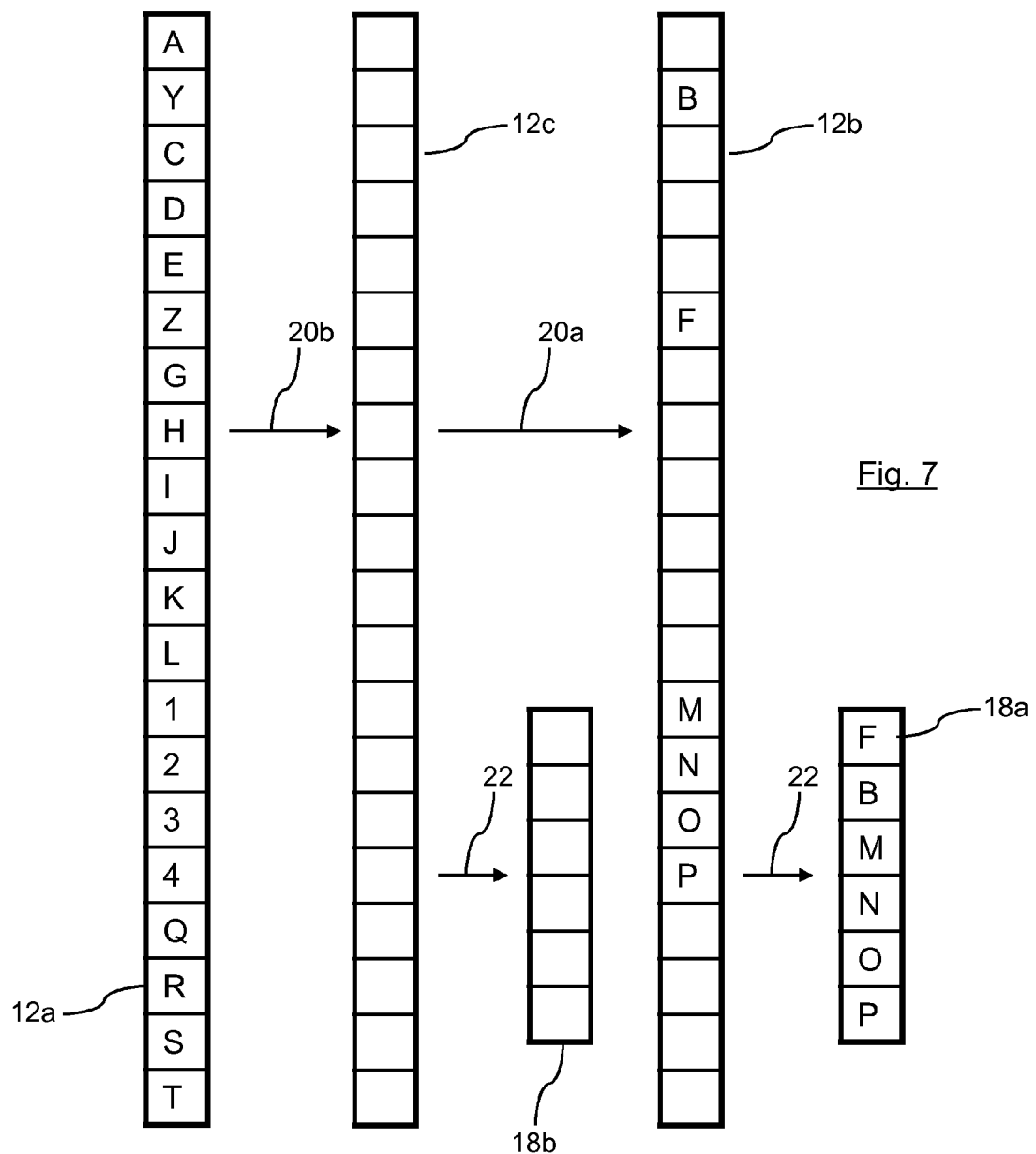

Now that the space efficient disk is full, it is necessary to terminate the original flashcopy 20a and initiate a new flashcopy 20b for the storage volume 12a. In the system, the triggering of a new copy of the source disk 12a will insert the target 12c in-between the map between 12a and 12b, now, when data changes on the source, the "grain split" will cause the original data to be written to 12c but not affect 12b. The system can leave the flashcopy map 20a untouched until the disk 12b has been archived safely, and then delete both the backup and the original flashcopy map 20a safely. This is shown in FIG. 7, where a new backup volume 12c is now linked to the source storage volume 12a via a new flashcopy 20b. A new backup storage medium 18b is also required, in order to ultimately backup the data that is flashcopied to the new storage volume 12c. Any changes that are made to the source storage volume 12a result in the relevant part of the volume 12a being first copied to the new backup volume 12c, before any overwriting occurs.

Figure 8:
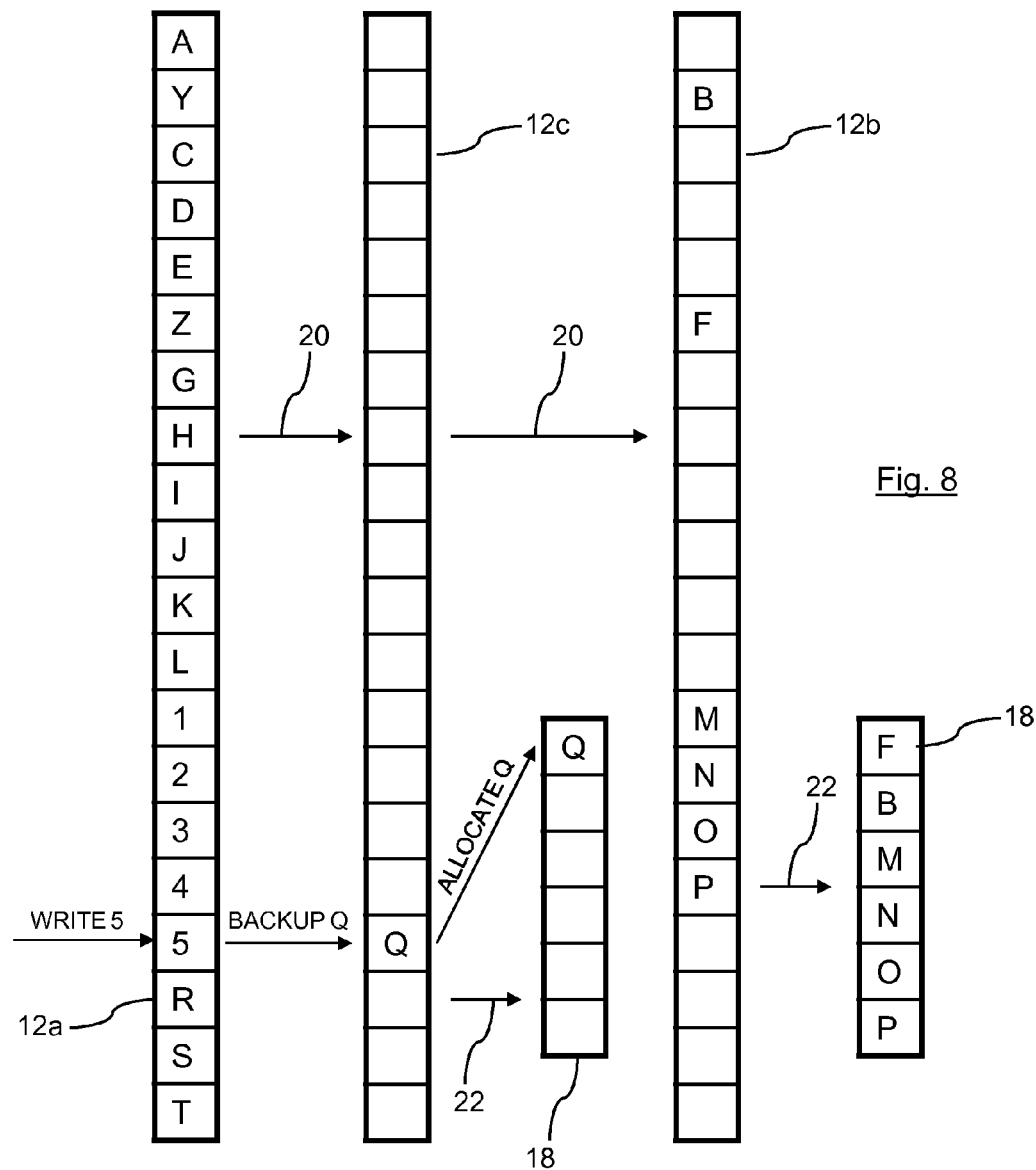

As new writes are received for the source storage volume 12a, they are now backed-up by the new flashcopy process 20b which is linking the volume 12a to the new backup storage volume 12c. FIG. 8 shows the result of a new write "5" being received that will overwrite the data "Q". As shown in this Figure, the old data "Q" is first copied to the target storage volume 12c, which is also a space efficient storage volume 12c. All future writes are backed up to the new backup disk 12c. The old data "Q" is also allocated to the new backup storage medium 18b, although not yet written to the medium 18b. The first backup represented by volume 12c can be safely archived to the fixed media 18a, and then deleted from the system. Future grain splits will be backed up to the second space efficient disk 12c.

Full backups will only be necessary if the volume 12a is imported into the backup regime with real data already on it, otherwise the first flashcopy backup will contain the very first, for example DVD's worth, of data written to the system. As well as whole volume recovery, partial old data may be more quickly accessible. Recently written data will be on the more recently created backup portions. One disadvantageous scenario is that if some portions of the data in the volume 12a are written frequently and some not very often at all, there will be a variance in the age of the actual backup media 18 that contains a particular piece of data. Data, in the volume 12a, that has not been written for a long time will be on backup media that was created some time ago.

As well as going back one archive at a time and, if not finished, repeating the process, the system could easily retain an index of which portions of data are present in which archive. This could be stored on every backup media 18 or retained in the system. One scheme (discussed in more detail below) could be used to trim the tail of the archived data to fewer archive volumes. The problem of the whole dataset of the storage volume 12a not fitting onto one DVD/tape would be just as present on simplistic portion/volume 1, 2, 3, etc. based strategy.

In summary, the system 10 operates to create a temporary discardable space efficient flashcopy of data that needs to be regularly archived and monitor the size of that backup on the volume 12b. When the size reaches a particular trigger point (independent of time) this triggers the flashcopy process being stopped midway, and a new subsequent flashcopy being commenced, and so on in a loop. The archival process then occurs directly from the first partial flashcopy on the volume 12b, this being discarded when the archive is complete. This mechanism is combined with an appropriate restoration process. Also, as mentioned, a further improvement is possible, to control the profile of archive media used for certain patterns of data writing to limit the number of archive volumes 18 required to restore a complete volume 12a of data.

An additional optional feature that further improves the system is delivered by the storage volume controller 14. In order to limit the number of DVDs 18 required to rebuild the full volume 12a from the backup media 18, the time (or preferably the number of generations) since the last backup of each flashcopy grain could be tracked. If there are some set of gains that have not been backed up for a threshold number of backups, then space to back these up can be reserved on the media 18 if desired and they can be additionally flagged for archiving on the current backup 12b, even if they are not changed on the volume 12a. This feature means that a limit can be set on the maximum number of generations required to do a full restore of the dataset. It is understood that this could cause more than one archive dataset to be triggered/required to accomplish the archiving of an arbitrarily large subset of the volume when, for example, only 3% of the volume is repeatedly written to until the remaining 97% passes the set trigger. Therefore, an improved scheme is described below that will only ever result in one archive volume's worth of data expiring in this manner in any one archive period.

It is also possible to use metadata that records the data has been backed up on the archive 18, which can be retained and merged with the next one and so on and/or retained as accurate in the system (and possibly stored with each archive 18). This means that for a particular range of data, the system (either at runtime or from reading any single archive media) will be able to request retrieval of the exact archive media (and not require all the archives from the current one back to the one that contains the data in a recursive cascade.

The process of creating the incremental backups is described below in more detail. In general, when flashcopying data from the source volume 12a to a space efficient target volume 12b, the target 12b would start with no data on it, and, because it is space efficient, zero size. The background copy rate of the flashcopy is set to zero to prevent any data being copied to the target 12b by the normal background copy process, other than that which will occur on future writes to the source disk, see below. When the source volume 12a is written to, as part of the flashcopy, if the old data has not been copied to the target 12b yet, then it is copied to the target 12b first, before the source data is overwritten. This is called a grain split. The target 12b will expand in size as data is copied across to it, and will comprise of all the differences between the disk as it currently looks and how it looked when the copy was started, meaning that the target volume 12b is storing a delta.

Once the size of the target volume 12b has reached the size of the backup medium 18, in this the preferred embodiment, a new flashcopy is started as a second target and the new target would also be space efficient, and follow the above steps. The original target 12b can be split out from the flashcopy, thereby stopping the copying process, and have its raw image, i.e. purely the data that has been copied to the target 12b as a result of grain splits, written to the backup medium 18. Once the backup has been put onto the backup medium, the original space efficient flashcopy target volume 12b can be deleted. There is thus described a way to regularly and efficiently archive a live dataset within a fixed size limit without disrupting IO to the source dataset 12a, which will automatically adjust its frequency to the required level, without the requirement for new custom processes to calculate the size of the delta over and above those in existence, plus the ability to stop, detach a partially complete flashcopy.

Furthermore, here is the further part of the system, which can be considered optional. The system operates to store only archives deltas to the original data set stored on the volume 12a, so as for all such schemes it is not guaranteed that any particular block of the data will be within the last X deltas (archives). However if it is desired to limit the number of archives needed to restore a whole dataset then the following is possible. A solution is achieved by reserving a portion of the backup media 18 for storing, for example, a twentieth, of the original volume 12a and then storing the 1st twentieth, 2nd, twentieth, 3rd twentieth and so on, on each successive archive disk 18. Thus regardless of the pattern of writes made to the original volume 12a, it is always possible to restore a complete picture of the original data by accessing at most twenty consecutive backups. This scheme is the simplest, but is wasteful of archive space as it stores data in the, for example, twentieth portion set aside for this purpose that may appear elsewhere in the archive, or in the set of twenty archive disks 18.

To improve on this it is possible to operate a scheme that only seeks to store data which has not been archived by the methodology above within a particular number of generations/archives. So for example, if it is desired to use a maximum of twenty disks 18 to restore a whole volume 12a, then there is designated the 20th archive ago as the oldest required archive, referred to as the ORA. As the system is about to begin the period that will involve data writes that will appear in the next archive, the controller 14 will analyse the current list of "this-grain-was-last-stored-in-archive-XXX" values. For data segments that appear in the ORA but not elsewhere in the subsequent nineteen archives they are candidates for potentially being required to be included in this next archive, not because they have been written to by the host but because they will be lost from set of the previous twenty archives when the current ORA drops out of the set. These data portions can be referred to as expiring data segments. So the system will need to track the expiring data segments for each archive period. In order to be able to tell the last time a data segment was written the system will use an incrementing archive number that will count 1, 2, 3, 4, 5, 6 and so on.

There is maintained a list of the archive number in which each data segment last appeared that is updated to be the current archive number when a particular data segment is written to that archive 18, done when each archive is generated. As this array of numbers are all updated in one go as part of the archive process they can be stored as a separate data structure or file used by of the archive process. So when the system is preparing (for example in a scheme that wishes to archive the whole dataset in the last twenty archive media) an archive with the sequence number of 47, the system will need to archive any data segments that have the "last-archived-in-archive" number of 27 on them.

During the beginning of this period, though not preventing the start of it, as it is calculating values that will be needed towards the end of the period, it is possible to count the number of data-segments with a "last-archived-in-archive" number of 27 on them. So now the system can calculate the number of grains splits allowed to be triggered by host writes for this archive period as: count of allowable grain splits caused by host writes=(size of archive media−total size of expired grain splits)/size of grain. This produces an integer count that can be decremented each time a grain split occurs due to a host write, if the grain being split has a "last-archived-in-archive" number>than 27. As, if the value is <=27 the space that this grain will take on the archive media is already accounted for in the other part of the equation above.

When this count reaches 0 then the archive process will be triggered, any remaining grains still at level 27 will be artificially split, and thus be included in the archive, and have their "last-archived-in-archive" number set to 47. Thus the archive can now be triggered based on a dynamically adjusting amount of host writes that will adjust based on the spread of the writes during the last (in this example) twenty archives and the set limit of the maximum number of generations required for a full restore (again twenty in this example).

The background splitter can work in parallel to the host writes but with lower priority, thereby artificially splitting grains that have a "last-archived-in-archive" number of <=27. As it will be possible to easily track what percentage complete the background splits (due to expiry) process is and what percentage used up the number of splits due to host writes is, as these two processes should ideally finish together, it is easily possible to adjust the background split process priority to finish at approximately the same time so as to not delay the archive process by having to do extra expiry work at the end of the period.

Figure 9:
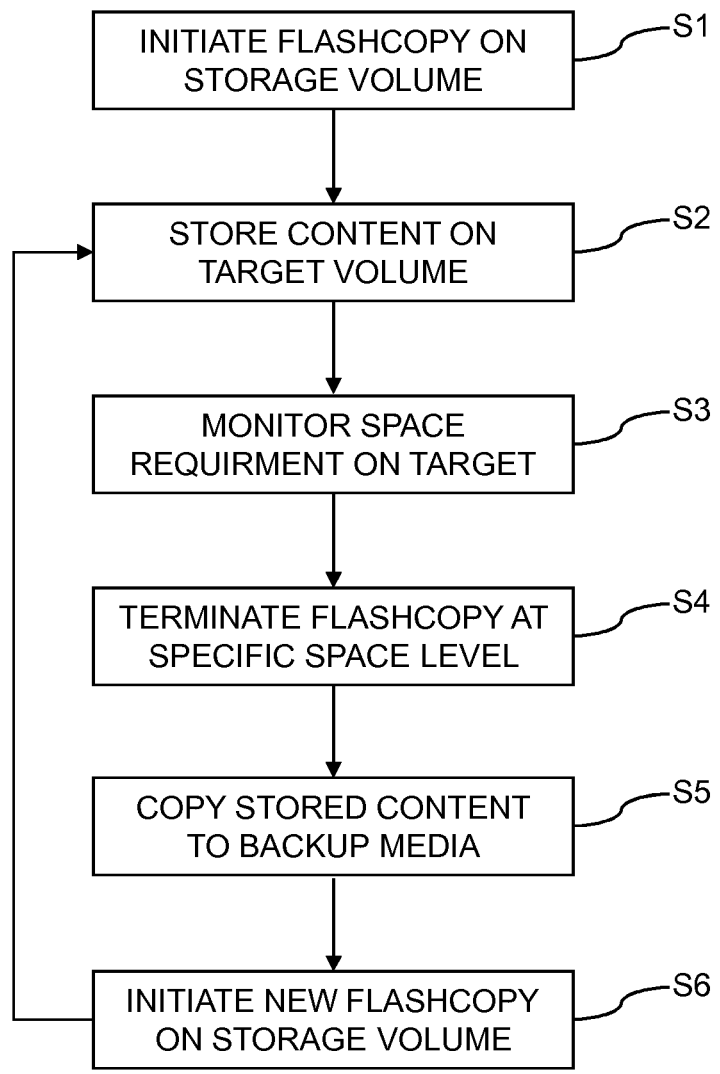
FIG. 9 is a flowchart of an exemplary method of operating the exemplary backup process previously depicted in FIGS. 3 to 8.

The overall process is summarized in FIG. 9. The method of performing the backup of the source storage volume 12a to the target storage volume 12b comprises firstly the step S1 of initiating the flashcopy of the source storage volume 12a to the target storage volume 12b. The next step S2 is the step of storing the content of the source storage volume 12a on the target storage volume 12b in a space efficient manner, as the flashcopy progresses. Each write on the source storage volume 12a results in content being copied from the source volume 12a to the target 12b, before the write is executed on the volume 12a.

The next step is step S3, which comprises the monitoring of the space requirement of the stored content on the target storage volume 12b. The volume controller 14 carries out this monitoring while the flashcopy process is taking place. The next step S4 comprises the terminating of the flashcopy when the space requirement reaches a predetermined level (such as the size of the backup storage medium 18), which is followed by the step S5 of copying the stored content on the target storage volume 12b to the backup storage medium 18. The final step S6 is the step of initiating a new flashcopy of the source storage volume 12a. The process then cycles back to step S2 with respect to the new flashcopy and new backup storage volume.

It should be noted that although the flowchart shows the steps occurring sequentially, in a practical implementation of the backup process some of the steps may well be occurring at least partially simultaneously. For example, the step S3 will be occurring concomitant with the step S2, and the step S5 of copying the content to the backup medium 18 may also occur simultaneously with the step S2. The order in which the method steps are carried out is also flexible. For example, the step S6 of initiating a new flashcopy can be carried out directly after step S3, with the process looping round after step S4 back to step S2, while the copying task of step S5 can be carried out in the background as the process proceeds through the main steps S2, S3, S6 and S4, in that order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method of performing a backup of a source storage volume to a target storage volume by a processor device comprising:
    initiating a flashcopy of the source storage volume to the target storage volume;
    storing the content of the source storage volume on the target storage volume in a space efficient manner;
    monitoring a space requirement of the stored content on the target storage volume;
    terminating the flashcopy of the source storage volume to the target storage volume when the space requirement of the stored content on the target storage volume reaches a size of an allocated space in the target storage volume coinciding with a size of a backup storage medium;
    copying the stored content on the target storage volume to the backup storage medium,
    initiating a new flashcopy of the source storage volume when the space requirement of the stored content on the target storage volume reaches the size of the allocated space in the target storage volume by inserting an other target storage volume in between the source storage volume and the target storage volume and allowing additional data to be written to the other target storage volume without affecting the target storage volume, the source storage volume being linked to a new backup storage medium having a size, and the other target storage volume having an other allocated space having a size that coincides with the size of the new backup storage medium;
    archiving the stored content from the backup storage medium; and
    deleting both the flashcopy and the stored content on the backup storage medium after the stored content has been archived.

2. The method according to claim 1, wherein the step of storing the content of the source storage volume on the target storage volume comprises including in the stored content a predetermined percentage of an oldest data stored by the source storage volume.

3. The method according to claim 1, further comprising detecting that a portion of the source storage volume has not been backed-up in a predetermined number of flashcopies.

4. The method according to claim 3, wherein the step of storing the content of the source storage volume on the target storage volume comprises including in the stored content the detected portion the source storage volume.

5. The method according to claim 1, further comprising setting the background copy rate in the flashcopy to zero.

6. The method according to claim 1, further comprising, when initiating a flashcopy of the source storage volume to the target storage volume, initiating a flashcopy when a first data write is made to the source storage volume.

7. A method of performing a backup operation of a source storage volume to a target storage volume using a processor device comprising:
    flashcopying a portion of original data in the source storage volume that is to be overwritten to a first allocated space of the target storage volume in response to data write requests;
    terminating flashcopying the portion of the original data to the target storage volume, in response to a detection that the first allocated space of the target storage volume having a capacity that coincides with a size of a first backup storage medium has been filled;
    initiating a new flashcopy of an other portion of original data in the source storage volume that is to be overwritten to a second allocated space of the target storage volume in response to additional data write requests and to the detection that the first allocated space of the target storage volume has been filled;
    inserting the second allocated space of the target storage volume between the source storage volume and the first allocated space, the second allocated space having a capacity that coincides with a size of a second backup storage medium, in response to initiating the new flashcopy;
    archiving the portion of the original data that has been copied to the first backup storage medium; and
    deleting the portion of the original data from the first allocated space of the target storage volume, after the portion of the original data copied to the first backup storage medium has been archived.

8. The method of claim 7, further comprising writing the other portion of the original data from the source storage volume to the second allocated space of the target storage volume without affecting the first allocated space of the target storage volume.

9. The method of claim 7, further comprising copying the portion of the original data from the first allocated space of the target storage volume to the first backup storage medium.

10. The method of claim 7, further comprising storing a predetermined percentage of oldest data stored by the source storage volume on the target storage volume.

11. The method of claim 7, further comprising detecting that a portion of the source storage volume has not been backed-up in a predetermined number of flashcopies.

\* \* \* \* \*